United States Patent
Kusuno et al.

(10) Patent No.: US 6,627,568 B2
(45) Date of Patent: Sep. 30, 2003

(54) INORGANIC FIBER AND METHOD OF PRODUCING THE SAME

(76) Inventors: Katsuya Kusuno, 1-8-1, Shinmiyakoda, Hamamatsu-shi, Shizuoka (JP); Satoshi Dohi, 1-8-1, Shinmiyakoda, Hamamatsu-shi, Shizuoka (JP); Hideki Kitahara, 1-8-1, Shinmiyakoda, Hamamatsu-shi, Shizuoka (JP)

( * ) Notice: Subject to any disclaimer, the term of this patent is extended or adjusted under 35 U.S.C. 154(b) by 0 days.

(21) Appl. No.: 09/938,530

(22) Filed: Aug. 27, 2001

(65) Prior Publication Data

US 2002/0045528 A1 Apr. 18, 2002

(30) Foreign Application Priority Data

Aug. 28, 2000 (JP) ........................................ 2000-257630

(51) Int. Cl.[7] ............................ C03C 13/06; C03C 3/078
(52) U.S. Cl. ............................... 501/36; 501/72; 501/38
(58) Field of Search ........................... 501/35, 36, 38, 501/55, 72, 70, 69; 65/454

(56) References Cited

U.S. PATENT DOCUMENTS

| | | | | |
|---|---|---|---|---|
| 4,002,482 A | * | 1/1977 | Coenen ..................... 106/628 |
| 4,830,989 A | * | 5/1989 | Trivedi et al. ............... 428/375 |
| 5,332,699 A | * | 7/1994 | Olds et al. ..................... 501/36 |
| 5,583,080 A | * | 12/1996 | Guldberg et al. ............. 501/35 |
| 5,585,312 A | * | 12/1996 | TenEyck et al. ............... 501/35 |
| 5,614,449 A |   | 3/1997 | Jensen |
| 5,691,255 A | * | 11/1997 | Jensen et al. ................. 501/36 |
| 5,874,375 A | * | 2/1999 | Zoitos et al. ................. 501/36 |

FOREIGN PATENT DOCUMENTS

| | | |
|---|---|---|
| DE | 195 30 030 | 2/1997 |
| DE | 198 40 396 | 1/2000 |
| FR | 2 662 687 | 12/1991 |
| JP | 10-512232 | 11/1998 |

OTHER PUBLICATIONS

Volf, M. B., "Chemical Approach to Glass: Glass Science and Technology 7", 1984, Elsevier Science Publishers, vol. 7, pp. 320–321.*

* cited by examiner

Primary Examiner—David Sample
Assistant Examiner—Elizabeth A Bolden

(57) ABSTRACT

A raw material including $SiO_2$, MgO and $TiO_2$, as essential components, is melt by heating at 1700 to 2000° C. The melt is fiberized by quenching in order to obtain inorganic fiber. The obtained inorganic fiber includes $SiO_2$, MgO and $TiO_2$ as essential components and an amorphous portion having these components in its structure.

8 Claims, 1 Drawing Sheet

INORGANIC FIBER AND METHOD OF PRODUCING THE SAME

BACKGROUND OF THE INVENTION

1. Field of the Invention

The present invention relates to inorganic fiber and a method of producing the same. More particularly, it relates to inorganic fiber which has excellent heat resistance and, even if taken into human bodies, is easily discharged.

2. Description of the Related Art

Inorganic fibers, such as heat-resistant glass fiber and ceramic fiber, are widely used for heat insulation in various structures such as buildings because of their high heat resistance.

The inorganic fibers are liable to float in air in the preparation, storage, transportation or use and can enter human bodies through inhalation. Some of relatively large fibers that enter human bodies are trapped in the nasal cavity or the oral cavity and discharged out of the body together with snivel or saliva, and others are swallowed and go to digestive organs such as a stomach. However, fine fibers, not being caught by the mucous of the nasal or oral cavity, reach lungs and adhere to alveoli (a balloon-like organ performing exchange oxygen for carbon dioxide between air and blood).

In general, if foreign matter enters alveoli, alveolar macrophages surround the foreign matter and transport it to the places having cilia, such as the trachea and bronchi, so that the foreign matter can be driven out with phlegm, or the foreign matter is expelled from the surface of alveoli through lymph and lymphatic vessels. However, cases are sometimes met with in which alveolar macrophages are irritated or damaged by foreign matter. As a result, protease and a collagen fiber decomposing enzyme come out of the cells, and the alveolar cells suffer inflammation or become collagen in the presence of a large amount of such enzymes. Since cells suffering from inflammation have weakened resistance, DNA in the cell nuclei are susceptible to damage, and the cells frequently alternate destruction and regeneration, affording abnormal cells opportunities to develop. It may follow that denaturation of DNA cells or development of cancer cells are induced.

Hence, inorganic fibers for this kind of use have recently come to be required to have biodegradability, namely, biosolubility in physiological fluids such as pulmonary fluid, as well as heat resistance. Various inorganic fibers have been developed to date to meet these requirements. For example, JP-W-10-512232 (WO97/16386) discloses glass fiber having heat resistance to 1260° C. and non-durability against physiological fluids which comprises silica ($SiO_2$) and magnesia (MgO) as essential components and zirconia ($ZrO_2$) as an optional component.

However, an inorganic fibers which reach alveoli usually have a fiber length of about 20 to 100 $\mu$m, being so larger than general foreign matter such as viruses and bacteria that alveolar macrophages often fail to trap them. Besides, solubility of the conventional inorganic fibers is not higher than about several tens to several hundreds [$ng/cm^2 \cdot hr$], and dissolution proceeds uniformly overall. Therefore, it takes a considerable time for the inorganic fibers to reduce in length to such a degree that alveolar macrophages may surround definitely without incurring irritation or damage, and there is a great possibility that the alveolar macrophages suffer damages meanwhile.

SUMMARY OF THE INVENTION

An object of the present invention is to provide an inorganic fiber having excellent biodegradability as well as heat resistance equal or superior to that of conventional inorganic fibers. Another object of the invention is to provide a method of producing such an inorganic fiber.

The present invention accomplishes the above object by providing an inorganic fiber which comprises $SiO_2$, MgO and $TiO_2$, as essential components, and has an amorphous portion comprising these components in its structure.

The present invention also accomplishes the above object by providing a method of producing inorganic fiber which comprises melting a raw material comprising $SiO_2$, MgO and $TiO_2$, as essential components, by heating at 1700 to 2000° C. and fiberise the melt by quenching.

DETAILED DESCRIPTION OF THE PREFERRED EMBODIMENTS

Figure 1:
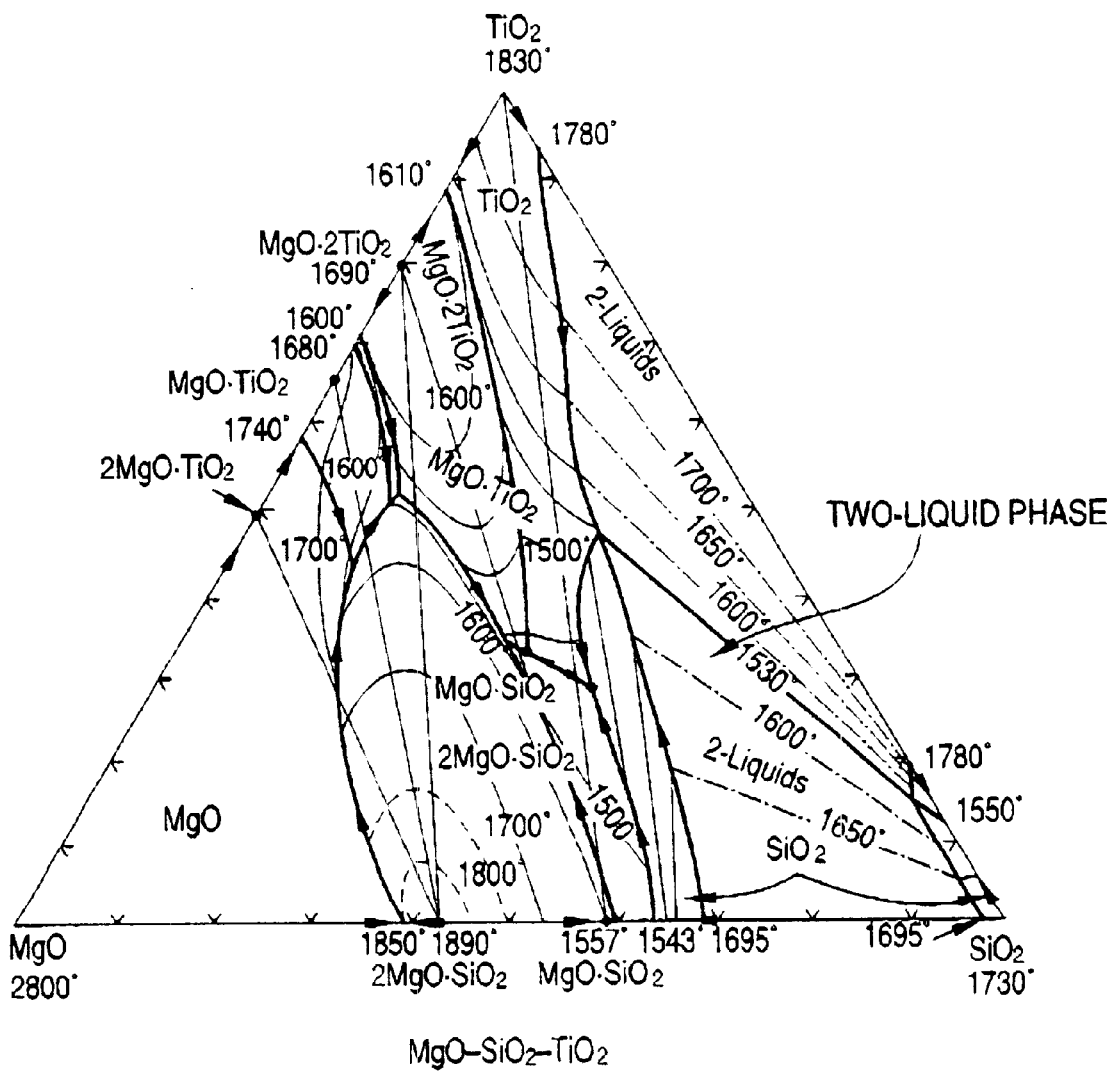
FIG. 1 is a phase diagram showing a ternary system of an $SiO_2$—MgO—$TiO_2$, which is an essential component of inorganic fibers according to the present invention.

The present invention will be described in detail by referring to the accompanying drawing.

The inorganic fiber of the present invention comprises $SiO_2$, MgO and $TiO_2$ as essential components.

On being melted together with $SiO_2$, $TiO_2$ essentially shows immiscibility over a broad mixing ratio. In the immiscible region (two-liquid phase region), the melt separates into two liquid phases of different compositions. On being cooled slowly, the two liquid phases finally get into a solid having a certain composition. The higher the melt temperature becomes, the greater the difference in composition between the two liquid phases becomes. FIG. 1 is a phase diagram of an $SiO_2$—MgO—$TiO_2$ three-component system (Franco Massazza and Efisia Sirchia, *Chim. Ind.*, vol. 40, p. 466, Milan (1958)). As shown, the three-component system similarly forms a two-liquid phase region.

In the present invention, a raw material comprising the essential components is heated in high temperature, and the melt having the above-mentioned two-liquid phase region is quenched to produce an amorphous high-$SiO_2$/low-MgO region and an amorphous low-$SiO_2$/high-MgO region thereby to form a fiber structure in which these regions are in a mixed state. Because MgO is more soluble in physiological fluids than $SiO_2$, the fibers dissolve faster in the low-$SiO_2$/high-MgO region, where the fiber structure is broken. As a result, the individual inorganic fibers taken into the body are divided into a plurality of fiber pieces.

As stated above, since too large foreign matter is difficult for alveolar macrophages to surround, and conventional inorganic fibers dissolve uniformly, a considerably long time has been needed for alveolar macrophages to sufficiently lay siege to the fibers. To the contrary, the inorganic fibers of the invention, with some progress of dissolution, break into short fibers that are ready to be surrounded by alveolar macrophages. As a result, the inorganic fiber can be discharged from the body in a shorter time than has been required. Further, the broken surface of the individual fibers serves as a new site for starting dissolution to accelerate the dissolution against physiological fluids thereby further reducing the time required for reaching the size small enough for the macrophages to surround.

Accordingly, the mixing ratio of the essential components, $SiO_2$, MgO and $TiO_2$, are selected so as to be able to form the above-described two-liquid phase region. Specifically, a preferred composition comprises 60 to 80% by weight of $SiO_2$, 15 to 30% by weight of MgO, and 0.5 to 20% by weight of $TiO_2$. A still preferred fiber composition comprises 65 to 80% by weight of $SiO_2$, 15 to 28% by weight of MgO and 2 to 20% by weight of $TiO_2$. A particularly preferred fiber composition comprises 65 to 80% by weight of $SiO_2$, 15 to 28% by weight of MgO, and 4 to 20% by weight of $TiO_2$. A most desirable fiber composition comprises 70 to 80% by weight of $SiO_2$, 15 to 28% by weight of MgO, and 4 to 20% by weight of $TiO_2$.

$SiO_2$ is a component forming the network skeleton of the inorganic fiber and making a great contribution to heat resistance. An $SiO_2$ content less than 60% by weight results in insufficient heat resistance. However, an $SiO_2$ content more than 80% by weight results in too high a melt viscosity, which is unfavorable for fiberising. MgO has high solubility in physiological fluids and contributes to fiber breakage. An MgO content less than 15% by weight is insufficient for manifesting its effect. MgO is also effective in decreasing the melt viscosity, which favors to smooth fiberising. Accordingly, the MgO content should be at least 15% by weight. If the MgO content exceeds 30% by weight, the amounts of the other components are relatively reduced, failing to produce the desired effects. $TiO_2$ is a component necessary to form the above-described two-liquid phase region. In order for $TiO_2$ to produce its effect sufficiently, the $TiO_2$ content should be at least 0.5% by weight. A $TiO_2$ content exceeding 20% by weight results in hindrance to fiberising because immiscibility of the melt becomes excessive to make too much difference in composition between the high-$SiO_2$ region and the low-$SiO_2$ region, resulting in a failure of stable fiberising.

Besides being biodegradable, the inorganic fiber of the invention is equal or superior in heat resistance to conventional inorganic fibers. For example, the inorganic is fiber having the above-described composition has a percent shrinkage as low as 5% or less when heated at 1200° C. for 8 hours, proving sufficiently heat resistant for practical use. Moreover, the inorganic fiber retains the fibrous shape when heated at 1400° C. for 8 hours as demonstrated in Examples hereinafter given. Seeing that heat resistance owes basically to $SiO_2$, the $SiO_2$ content can be increased within the above-recited range where heat resistance is of particular interest.

If desired, the inorganic fiber can comprise other components such as MnO, up to 10% by weight, which is effective in increasing solubility in physiological fluids, and $ZrO_2$, which has little influence on fiber physical properties but is effective in improving the yield in fiberising. Considering that addition of these components can sometimes reduce the fiber's breakability, the amounts of MnO and $ZrO_2$ to be added should be up to 10% by weight, respectively. Addition of more than 10% by weight of MnO or $ZrO_2$ results in an abrupt rise of melt viscosity of the raw material mixture per se, making stable fiberising difficult.

The starting materials providing each component are not particularly limited. While incorporation of impurities originated in raw materials is unavoidable, it is preferred to control an $Al_2O_3$ content not to exceed 2% by weight and to control a CaO content not to exceed about 3% by weight. $Al_2O_3$ forms an aluminosilicate with $SiO_2$ and reduces the overall solubility of the fiber in physiological fluids. CaO forms a low-melting compound with $SiO_2$, which reduces the overall heat resistance of the fiber. Since alkali metal or alkaline earth metal oxides, such as $Na_2O$, $K_2O$ and BaO, and $B_2O_3$ impair heat resistance of the fiber if present in large amounts, it is desirable that the content of each of them be 0.5% by weight or less and their total content be 2% by weight or less.

The inorganic fiber of the present invention can be obtained by heating a raw material comprising the above-recited components at a high temperature of from 1700 to 2000° C. and quenching the melt for fiberising. The fiberising by quenching can be effected by, for example, blowing. The starting raw materials include not only pure compounds but $SiO_2$ sources, such as silica and; MgO sources, such as magnesite, magnesia clinker, olivine, and olivine sand; $TiO_2$ sources, such as ilmenite, beach sand, and rutile; MnO sources, such as manganese ore, rhodonite, and tephroite; and $ZrO_2$ sources, such as baddeleyite and zircon sand.

The present invention will now be illustrated in greater detail with reference to Examples, but it should be understood that the present invention is not construed as being limited thereto.

[Experiment 1]

(Preparation of Inorganic Fiber)

Predetermined amounts of silica sand, magnesium oxide and titanium oxide were mixed and heated at 1700 to 2000° C. The resulting melt was fiberised by blowing, and the fibers were collected. The composition of the resulting fiber is shown in Tables 1 and 2. Comparative Example 6 is a highly heat-resistant ceramic fiber commonly employed in the art. Comparative Examples 7 and 8 are fibers classified as "category 0 (no carcinogenicity)" according to the European classification of biosolubility.

TABLE 1

| Example No. | Chemical Composition (wt %) | | | | | |
| --- | --- | --- | --- | --- | --- | --- |
| | $SiO_2$ | MgO | $TiO_2$ | $Al_2O_3$ | CaO | Others |
| 1 | 72.2 | 19.9 | 6.3 | 1.1 | 0.3 | 0.2 |
| 2 | 71.4 | 22.8 | 4.2 | 1.3 | 0.2 | 0.1 |
| 3 | 64.9 | 16.9 | 16.8 | 1.1 | 0.2 | 0.1 |
| 4 | 68.4 | 17.7 | 12.4 | 1.2 | 0.2 | 0.1 |
| 5 | 65.1 | 15.1 | 18.2 | 1.2 | 0.2 | 0.2 |
| 6 | 63.2 | 28.2 | 7.0 | 1.2 | 0.2 | 0.2 |
| 7 | 67.9 | 25.5 | 5.0 | 1.3 | 0.2 | 0.1 |
| 8 | 68.1 | 23.9 | 5.6 | 1.8 | 0.3 | 0.3 |
| 9 | 60.2 | 26.4 | 11.1 | 1.8 | 0.3 | 0.2 |
| 10 | 73.1 | 24.1 | 0.5 | 1.5 | 0.3 | 0.5 |
| 11 | 78.2 | 18.2 | 2.1 | 1.1 | 0.2 | 0.2 |
| 12 | 71.9 | 23.3 | 3.2 | 1.2 | 0.2 | 0.2 |

TABLE 2

| Comparative Example No. | Chemical Composition (wt %) | | | | | |
| --- | --- | --- | --- | --- | --- | --- |
| | $SiO_2$ | MgO | $TiO_2$ | $Al_2O_3$ | CaO | Others |
| 1 | 57.7 | 17.9 | 22.9 | 1.1 | 0.2 | 0.2 |
| 2 | 58.4 | 24.5 | 15.6 | 1.1 | 0.2 | 0.2 |
| 3 | 76.2 | 13.1 | 8.8 | 1.2 | 0.4 | 0.3 |
| 4 | 82.1 | 15.0 | 1.1 | 1.3 | 0.4 | 0.1 |
| 5 | 61.1 | 33.1 | 4.0 | 1.2 | 0.4 | 0.2 |
| 6 | 51.5 | 0.0 | 0.0 | 48.2 | 0.0 | 0.3 |
| 7 | 77.7 | 18.9 | 0.0 | 2.2 | 0.3 | 0.9 |
| 8 | 63.8 | 3.3 | 0.0 | 0.6 | 32.3 | 0.0 |

(Solubility Test)

Each of the fibers shows in Tables 1 and 2 was ground to a 200 mesh undersize. About one gram of the undersize particles was weighed out and put in a 300 ml Erlenmeyer flask with a stopcock, and 150 ml of physiological saline having the formulation shown in Table 3 was added thereto. The flask was shaken horizontally at a rate of 120 shakes/min. for consecutive 50 hours while maintaining the mixture at 40° C. The mixture in the flask was filtered. The filtrate was analyzed with an ICP-AES apparatus to obtain solubility of the fiber by comparing the analytical results with the composition of the fiber.

TABLE 3

| Material | Weight |
| --- | --- |
| Water | 1 liter |
| Sodium chloride | 6.780 g |
| Ammonium chloride | 0.535 g |
| Sodium hydrogencarbonate | 0.268 g |
| Sodium dihydrogencitrate | 0.166 g |
| Sodium citrate dihydrate | 0.059 g |
| Glycine | 0.450 g |
| Calcium chloride | 0.022 g |
| Sulfuric acid | 0.049 g |
| pH of Solution | 7.4 |

(Test on Fiber Length Reduction)

Each of the fibers of Tables 1 and 2 was screened, and a 325 mesh undersize (average fiber length: 80 to 100 μm) was photographed under a scanning electron microscope (SEM). The lengths of about 200 fibers in the micrograph were measured to give an average fiber length before treatment. An about 1 g of the fiber was put in a 300 ml Erlenmeyer flask with a stopcock, and 150 ml of physiological saline having the composition shown in Table 3 was added thereto. The flask was shaken horizontally at a rate of 120 shakes/min. for consecutive 50 hours while maintaining the mixture at 40° C. The fiber was taken out and dried. An average fiber length after the treatment was obtained by using a scanning electron microscope (SEM) in the same manner as described above. A fiber length reduction (%) was calculated from the equation as follows:

Fiber length reduction (%)=(fiber length before treatment−fiber length after treatment)×100/(fiber length before treatment)

(Heat Resistance Test)

Each of the fibers shown in Tables 1 and 2 was thoroughly disentangled. After particulate matter (commonly referred to as "shot") was removed, about 10 g of the fiber was put in a crucible without being pressed. The crucible was placed in an electric oven. The oven temperature was raised up to 1400° C. at a rate of 200° C./hr, at which the crucible was maintained for 8 hours. After cooling, the crucible was taken out of the oven, and the contents were observed with the naked eye. The shape retention was rated on four scales as follows:

A: The fiber shape was retained. The fiber showed flexibility.

B: The fiber shape was retained. The fiber showed poor flexibility.

C: The fiber shape was retained, but the fiber was ready to collapse on being pressed strongly.

D: The fiber was in a complete molten state.

The test results obtained are shown in Tables 4 and 5. It is proved that the inorganic fibers of Examples have high solubility in physiological saline and reduce their length greatly when treated with physiological saline. They are notably superior in these attributes to the commonly used ceramic fiber of Comparative Example 6 and still superior to the inorganic fibers of Comparative Examples 7 and 8, which are classified in "category 0 (no carcinogenicity)". The superiority is assumed ascribed to the presence of a prescribed $TiO_2$ content. That is, the fibers having a prescribed $TiO_2$ content break to furnish broken surfaces from which dissolution re-starts thereby accelerating dissolution. It is seen that the fibers of Examples also exhibit excellent heat resistance. In Comparative Examples 1 and 2 where the $SiO_2$ content is less than 60 wt %, the fibers melt when heated to 1400° C. The compositions of Comparative Examples 3 and 4 are considerably difficult to fiberise and unsuitable to industrial manufacture. The fiber of Comparative Example 5, whose composition is out of the two-liquid phase region, is much inferior to the fibers of Examples in fiber length reduction.

TABLE 4

| Example No. | Physiological Saline Solubility (%) | Fiber Length Reduction (%) | Heat Resistance | Fiberising |
| --- | --- | --- | --- | --- |
| 1 | 6.0 | 14.9 | A | possible |
| 2 | 6.9 | 14.3 | A | possible |
| 3 | 5.7 | 15.1 | B | possible |
| 4 | 5.9 | 14.8 | B | possible |
| 5 | 5.6 | 15.0 | B | possible |
| 6 | 6.5 | 14.6 | C | possible |
| 7 | 6.6 | 14.4 | B | possible |
| 8 | 6.3 | 14.2 | B | possible |
| 9 | 6.4 | 14.2 | C | possible |
| 10 | 6.5 | 11.5 | A | possible |
| 11 | 6.1 | 13.0 | A | possible |
| 12 | 6.6 | 13.6 | A | possible |

TABLE 5

| Comparative Example No. | Physiological Saline Solubility (%) | Fiber Length Reduction (%) | Heat Resistance | Fiberising |
| --- | --- | --- | --- | --- |
| 1 | — | — | D | difficult |
| 2 | — | — | D | possible |
| 3 | — | — | A | difficult |
| 4 | — | — | A | difficult |
| 5 | 5.2 | 2.1 | B | possible |
| 6 | 0.1 | 0.2 | A | ready-made |
| 7 | 5.2 | 10.3 | A | ready-made |
| 8 | 5.4 | 10.0 | A | ready-made |

[Experiment 2]
(Preparation of Inorganic Fiber)

Silica sand, magnesium oxide, titanium oxide, manganese dioxide and zircon sand were mixed at a predetermined ratio. The mixture was heated to 1700 to 2000° C., and the melt was fiberised by blowing, and the fibers were collected. The composition of the resulting fibers are shown in Tables 6 and 7.

TABLE 6

| Example No. | Chemical Composition (wt %) | | | | | | | |
| --- | --- | --- | --- | --- | --- | --- | --- | --- |
| | $SiO_2$ | MgO | $TiO_2$ | $Al_2O_3$ | CaO | MnO | $ZrO_2$ | Others |
| 13 | 71.1 | 20.3 | 4.0 | 1.3 | 0.5 | 2.7 | 0.0 | 0.1 |
| 14 | 66.5 | 20.1 | 2.2 | 1.2 | 0.2 | 9.6 | 0.0 | 0.2 |
| 15 | 71.3 | 20.0 | 4.0 | 1.4 | 0.3 | 0.0 | 2.9 | 0.1 |
| 16 | 66.9 | 19.7 | 2.1 | 1.1 | 0.3 | 0.0 | 9.7 | 0.2 |

TABLE 7

| Comparative Example No. | Chemical Composition (wt %) | | | | | | | |
| --- | --- | --- | --- | --- | --- | --- | --- | --- |
| | $SiO_2$ | MgO | $TiO_2$ | $Al_2O_3$ | CaO | MnO | $ZrO_2$ | Others |
| 9 | 65.1 | 20.4 | 2.3 | 1.2 | 0.3 | 10.5 | 0.0 | 0.2 |
| 10 | 66.3 | 19.0 | 2.4 | 1.3 | 0.2 | 0.0 | 10.7 | 0.1 |

(Solubility Test and Test on Fiber Length Reduction)

The inorganic fibers shown in Tables 6 and 7 were evaluated for solubility in physiological saline and fiber length reduction as well as the solubility test and the test on fiber length reduction in Experiment 1. The results obtained are shown in Tables 8 and 9.

TABLE 8

| Example No. | Physiological Saline Solubility (%) | Fiber Length Reduction (%) | Heat Resistance | Fiberising |
|---|---|---|---|---|
| 13 | 6.6 | 13.2 | A | possible |
| 14 | 6.9 | 12.2 | B | possible |
| 15 | 5.1 | 10.0 | A | possible |
| 16 | 5.3 | 9.8 | B | possible |

TABLE 9

| Comparative Example No. | Physiological Saline Solubility (%) | Fiber Length Reduction (%) | Heat Resistance | Fiberising |
|---|---|---|---|---|
| 9 | — | — | B | difficult |
| 10 | — | — | B | difficult |

The fiber compositions comprising up to about 10 wt % of MnO in addition to the $SiO_2$—MgO—$TiO_2$ system (Examples 13 and 14) show satisfactory biosolubility and fiber length reduction, being still superior to the inorganic fibers of Comparative Examples 7 and 8 which are alleged to be classified into category 0 (no carcinogenicity). The fiber compositions comprising up to about 10 wt % of $ZrO_2$ in addition to the $SiO_2$—MgO—$TiO_2$ system (Examples 15 and 16) are equal to the inorganic fibers of Comparative Examples 7 and 8 in solubility and fiber length reduction but superior to the conventional ceramic fiber of Comparative Example 6. It was also ascertained that addition of $ZrO_2$ facilitates fiberising. As can be seen from the results of Comparative Examples 9 and 10, addition of more than 10 wt % of MnO or $ZrO_2$ results in an abrupt increase of melt viscosity, which makes fiberising infeasible.

(Heat Resistance Test)

The inorganic fibers shown in Tables 6 and 7 were evaluated for performance on heat resistance in the same manner as the heat resistance test in Experiment 1. The results are shown in Tables 8 and 9, and from the results of the heat resistance test, it is seen that the fibers exhibit satisfactory heat resistance, proving that addition of MnO or $ZrO_2$ causes no impairment of heat resistance.

As described above, besides being equal or superior in heat resistance to the conventional inorganic fibers, the inorganic fiber according to the present invention is broken when taken into the lungs to enable alveolar macrophages to discharge the fiber out of the body soon thereby to suppress the adverse influences of the fiber on the body to the minimum.

What is claimed is:

1. An inorganic fiber consisting essentially of in percent by weight:

$SiO_2$ 65–80%;
   MgO 15–28%; and
   $TiO_2$ 2–20%;
   wherein an amorphous portion is included in a structure of said inorganic fiber and optionally one of MnO in an amount less than 10% and $ZrO_2$ in an amount less than 10% by weight and
   optionally, as impurities, not more than 2% $Al_2O_3$, not more than 3% CaO, and additional alkali metal oxides and alkaline earth metal oxides, excluding MgO and CaO, of not more than 2%.

2. The inorganic fiber according to claim 1, wherein the content of $SiO_2$ is 65–80% by weight, the content of MgO is 15–28% by weight or less and the content of $TiO_2$ of 4–20%.

3. The inorganic fiber according to claim 2, wherein the content of $SiO_2$ is 70–80% by weight, the content of MgO is 15–28% by weight, and the content of $TiO_2$ is 4–20% by weight.

4. The inorganic fiber according to claim 1, which contains one of MnO in an amount less than 10% by weight and $ZrO_2$ in an amount less than 10% by weight.

5. A method of producing inorganic fiber comprising consisting essentially of the steps of:

(a) heating a raw material including $SiO_2$, MgO and $TiO_2$ according to claim 1 at 1700 to 20000° C. to obtain a melt;
   (b) fiberizing the melt by quenching.

6. An inorganic fiber consisting essentially of in percent by weight:

$SiO_2$ 60–80%;
   MgO 15–30%;
   $TiO_2$ 0.5–20%
   and optionally one of MnO in an amount less than 10% and $ZrO_2$ in an amount less than 10% by weight and
   optionally, as impurities, not more than 2% $Al_2O_3$, not more than 3% CaO, and additional alkali metal oxides and alkaline earth metal oxides, excluding MgO and CaO, of not more than 2%
   wherein an amorphous portion is included in a structure of said inorganic fiber and said inorganic fiber has a solubility in physiological saline superior to category O of the European classification of biosolubility.

7. An inorganic fiber consisting essentially of in percent by weight:

$SiO_2$ 60–80%;
   MgO 15–30%;
   $TiO_2$ 0.5–20%
   and optionally one of MnO in an amount less than 10% and $ZrO_2$ in an amount less than 10% by weight and
   optionally, as impurities, not more than 2% $Al_2O_3$, not more than 3% CaO, and additional alkali metal oxides and alkaline earth metal oxides, excluding MgO and CaO, of not more than 2%
   wherein an amorphous portion is included in a structure of said inorganic fiber and said inorganic fiber retains its fiberous shape when heated to 1400° C. for eight hours.

8. An inorganic fiber consisting essentially of in percent by weight:

$SiO_2$ 60–80%;
   MgO 15–30%;
   $TiO_2$ 0.5–20%
   wherein the fiber when melted, forms two liquid phases.

* * * * *